(12) United States Patent
Hoener et al.

(10) Patent No.: US 12,522,130 B2
(45) Date of Patent: Jan. 13, 2026

(54) METHOD FOR OPERATING A HIGH-RESOLUTION HEADLAMP OF A VEHICLE

(71) Applicant: HELLA GmbH & Co. KGaA, Lippstadt (DE)

(72) Inventors: Markus Hoener, Bergkamen (DE); Christian Huester, Salzkotten (DE); Martin Seipel, Bad Wuennenberg (DE); Ingo Steiner, Dortmund (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 149 days.

(21) Appl. No.: 18/385,224

(22) Filed: Oct. 30, 2023

(65) Prior Publication Data
US 2024/0092250 A1    Mar. 21, 2024

Related U.S. Application Data

(63) Continuation of application No. PCT/EP2022/059768, filed on Apr. 12, 2022.

(30) Foreign Application Priority Data

Apr. 29, 2021    (DE) ..................... 10 2021 111 021.1

(51) Int. Cl.
  *B60Q 1/14*    (2006.01)
  *H05B 47/105*    (2020.01)
(52) U.S. Cl.
  CPC ........... *B60Q 1/143* (2013.01); *H05B 47/105* (2020.01); *B60Q 2300/054* (2013.01)

(58) Field of Classification Search
CPC .. B60Q 1/143; B60Q 2300/054; B60Q 1/085; H05B 47/105; F21S 41/153;
(Continued)

(56) References Cited

U.S. PATENT DOCUMENTS

| 10,464,470 B2 | 11/2019 | Ohno |
| 11,435,052 B2 | 9/2022 | Mimoun |

(Continued)

FOREIGN PATENT DOCUMENTS

| DE | 102013104276 A1 | 10/2014 |
| DE | 102019208662 A1 * | 12/2020 |

(Continued)

OTHER PUBLICATIONS

International Search Report dated Aug. 2, 2022 in corresponding application PCT/EP2022/059768.

*Primary Examiner* — Abdullah A Riyami
*Assistant Examiner* — Syed M Kaiser
(74) *Attorney, Agent, or Firm* — Muncy, Geissler, Olds & Lowe, P.C.

(57) ABSTRACT

A method for operating a high-resolution headlamp of a vehicle, the headlamp being configured to project an image into the outer region of the vehicle. At least two regions are selected in the image to be projected which have the same brightness gradients. The brightness gradients of the at least two regions are analyzed in the projection to be carried out. If, during the analysis, a difference in the brightness gradients between individual ones of the selected regions is detected in the projection to be carried out, the headlamp is controlled in such a way that the brightness gradients of the selected regions in the projection to be carried out are matched to each other.

14 Claims, 2 Drawing Sheets

(58) Field of Classification Search
CPC ...... F21S 41/645; F21S 41/663; F21S 41/675; H04N 9/3138; H04N 9/3182; F21W 2102/16; F21W 2102/20
See application file for complete search history.

(56) References Cited

U.S. PATENT DOCUMENTS

| | | | |
|---|---|---|---|
| 2019/0116345 A1 | 4/2019 | Albou et al. | |
| 2019/0202336 A1* | 7/2019 | Kumar | B60Q 1/1423 |
| 2020/0391760 A1* | 12/2020 | Reschke | B60W 50/14 |
| 2023/0311743 A1 | 10/2023 | Kanj et al. | |

FOREIGN PATENT DOCUMENTS

| | | | | |
|---|---|---|---|---|
| EP | 3246204 A1 | 11/2017 | | |
| EP | 3671015 A1 | 6/2020 | | |
| FR | 3055979 A1 * | 3/2018 | ........... | B60Q 1/1423 |
| FR | 3101694 A1 | 4/2021 | | |
| WO | WO-2018202890 A2 * | 11/2018 | ............... | B60Q 1/04 |
| WO | WO2020126525 A1 | 6/2020 | | |

* cited by examiner

METHOD FOR OPERATING A HIGH-RESOLUTION HEADLAMP OF A VEHICLE

This nonprovisional application is a continuation of International Application No. PCT/EP2022/059768, which was filed on Apr. 12, 2022, and which claims priority to German Patent Application No. 10 2021 111 021.1, which was filed in Germany on Apr. 29, 2021, and which are both herein incorporated by reference.

BACKGROUND OF THE INVENTION

Field of the Invention

The present invention relates to a method for operating a high-resolution headlamp of a vehicle, as well as a high-resolution headlamp for a vehicle.

Description of the Background Art

A method and a system for detecting a bend in a road driven by a vehicle are known from DE 603 02 322 T2, which corresponds to U.S. Pat. No. 7,689,002, which is incorporated herein by reference. Within the scope of the method, images of the roadway and the edge of the roadway are recorded with the aid of a camera arranged on the vehicle, a light decrease gradient between the roadway edge and the roadway being determined and evaluated.

A method for operating a headlamp for a motor vehicle is known from DE 10 2017 202 980 A1. In the method, a multiplicity of luminous points of the headlamp are controlled, each luminous point of the multiplicity of luminous points illuminating a particular predetermined spatial angle range. Individual light points are furthermore switched on and off in such a way that the headlamp generates a predetermined light distribution. To make an illumination variable at a light/dark boundary, it is also provided that the brightness gradient at the edge of the predetermined light distribution is varied by setting the brightness of luminous points from the multiplicity of luminous points.

A method for operating a high-resolution headlamp of a motor vehicle is known from DE 10 2019 101 710 A1, which corresponds to US 2020/0240607, which is incorporated herein by reference. The headlamp includes light influencing means or a plurality of light sources for the targeted generation of pixels of a light distribution, in the event that at least one pixel of the light distribution fails, which is caused by a defect of a section of the light influencing means or by a failure of one of the light sources, at least one non-defective section of the light influencing means or at least one of the non-failed light sources being controlled to correct the light distribution. The at least one non-defective section of the light influencing means or the at least one of the non-failed light sources is controlled in such a way that the brightness of at least one pixel of the light distribution adjacent to the at least one failed pixel is reduced.

An illuminating device for vehicles and a method for homogenizing a light distribution for vehicles is known from DE 10 2019 118 381 A1, which corresponds to US 2022/0128210, which is incorporated herein by reference. The illuminating device comprises a first light source having a number of first light pixels for generating a first partial light distribution as well as a second light source having a number of second light pixels for generating a second partial light distribution, the second partial light distribution having a higher resolution that the first partial light distribution. The illuminating device further comprises a control unit, which is able to control the first and second light sources in such a way that an illumination intensity gradient and/or a resolution difference gradient may be reduced in a transitional region between the first partial light distribution and the second partial light distribution. The second light source has a higher resolution than the first light source, the second light source having a multiple of second light pixels in relation to the first light source, based on an equal surface area, the second light pixels arranged in a boundary region of the second light source being controllable as a group in such a way that a number of the second light pixels controlled as a group in the boundary region of the second light source per unit of surface area increases from a first end of the boundary region in the direction of a second end of the boundary region.

A method for detecting edges in a camera image generated with the aid of a camera is known from DE 10 2017 209 700 A1, which corresponds to US 2018/0357769. Within the scope of the method, a particular scaling size is assigned to each pixel of the camera image as a function of object distances of a spatial region imaged in the pixel in relation to the camera. An integral image is also generated from the camera image. Haar wavelet transforms are furthermore applied to the pixels of the generated integral image for the purpose of generating a gradient image, a scaling of the Haar wavelets being determined for each of the pixels of the integral image to be transformed, taking into account the scaling size assigned to the corresponding pixel of the camera image. Edges are detected in the camera image, using the generated gradient image.

A method and a headlamp of the type mentioned at the outset are known from DE 10 2018 218 038 A1. The high-resolution headlamp described therein may project images having informative content into the outer region of the vehicle. The headlamp interacts with surroundings sensors to adapt the projection to the location of the projection surface, such as the roadway or the back of a preceding vehicle. The headlamp includes a Gaussian filter for the purpose of smoothing the edges of an image projected into the outer region. The image to be projected may comprise a piece of information in the form of at least one symbol and/or at least one letter and/or at least one number.

To effectively detect projected images of this type, the resolution of the high-resolution headlamp is important. However, it is also important for the projected images to appear uniform in order to be accepted by the driver. The projected images appear uniform when the transitions between light and darker regions which are the same in the input image to be projected also appear the same in the projected image on the road. This is the case, in particular, if they are imaged with the same sharpness or the same fuzziness. It has proven to be problematic that the appearance of the transitions between light and darker regions depends, for example, on how an edge to be imaged runs to the pixel raster of the headlamp. As a result, two regions, for example two edges which have the same brightness gradient in the input image to be projected may have unequal brightness gradients in the projected image on the road. This results in a reduced acceptance on the part of the driver.

SUMMARY OF THE INVENTION

It is therefore an object of the present invention to provide a method and a headlamp, with the aid of which it may be achieved that regions of the same brightness gradients in an image to be projected also have at least approximately the same or similar brightness gradients in the projected image.

In an exemplary embodiment, the method provides: selecting at least two regions in the image to be projected which have the same brightness gradients; and analyzing the brightness gradients of the at least two regions in the projection to be carried out, wherein, if, during the analysis, a difference is detected in the brightness gradients between individual ones of the selected regions in the projection to be carried out, the headlamp is controlled in such a way that the brightness gradients of the selected regions in the projection to be carried out are matched to each other.

Due to the analysis and the corresponding control of the headlamp, an adaptation of brightness gradients takes place in regions of the images projected by the headlamp in which the associated brightness gradients are also the same in the input image. An optimization of gradients thus ideally takes place between light and darker regions which are to appear the same in the projection, so that the projected image at least largely appears uniform. As a result, fewer irritations arise for the driver, so that a greater acceptance on the part of the driver may be achieved overall.

It is possible that, if a difference in the brightness gradients of the selected regions is detected, at least one of the brightness gradients of these regions in the projection to be carried out is reduced to the value of the lowest brightness gradient of the selected regions. In particular, if a difference in the brightness gradients of the selected regions is detected, multiple or all brightness gradients of these regions in the projection to be carried out are reduced to the value of the lowest brightness gradient of the selected regions. The reduction of at least one brightness gradient or some or all equal brightness gradients in the input image to the lowest value has proven to be easy to carry out.

It may be provided that the method is repeated, in that at least two other regions having matching brightness gradients are selected in the image to be projected. In this way, all regions of the projection are successively changed in such a way that irritations for the driver are avoided to the greatest possible extent.

It is possible that the selected regions are edges. Brightness gradients at edges of the image are particularly clearly perceptible. A better and more uniform representation of edges in projected symbols and images is therefore very advantageous.

It may be provided that the at least two selected regions in the projection to be generated are spaced a distance apart in the horizontal direction. Alternatively or additionally, it may be provided that the at least two selected regions in the projection to be generated are spaced a distance apart in the vertical direction. In this way, for example, the brightness gradients of both horizontal and vertical edges may be adapted to each other in each case.

It is possible that the analysis of the brightness gradients of the at least two regions in the projection to be carried out takes place in that the projection is simulated in a control device of the headlamp. In this way, the adaptation of the brightness gradients may be carried out without the aid of surroundings sensors of the vehicle, so that the adaptation may take place faster overall.

It may be provided that the image to be projected into the outer region of the vehicle comprises a piece of information, in particular in the form of at least one symbol, and/or at least one letter, and/or at least one number. In all of these embodiments, the acceptance by the driver may be improved by a suitable adaptation of corresponding brightness gradients.

Also, it is provided that the headlamp is configured to carried out a method according to the invention.

It is possible that the headlamp comprises a control device, which is able to control the illuminating elements for the targeted generation of pixels of a light distribution. The control device may be configured to carry out the analysis of the brightness gradients of the at least two regions.

It may be provided that the illuminating elements are designed as light-emitting diodes or as laser diodes, in particular, the illuminating elements being part of a solid-state LED array. Alternatively, it may also be provided that the illuminating elements are part of a digital micromirror device or an LCoS or an LC display. In this case, at least one light source is provided, which may illuminate the active surface of the digital micromirror device or the LCoS or the LC display.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the illustrated exemplary embodiment, a rectangle 2 is to be projected onto a roadway 3 with the aid of a high-resolution headlamp 1, which is, in particular, the left headlamp of a vehicle, which is not illustrated. Only the outline of rectangle 2 is drawn. However, it is to have a uniform illumination intensity over its entire surface.

Figure 1:
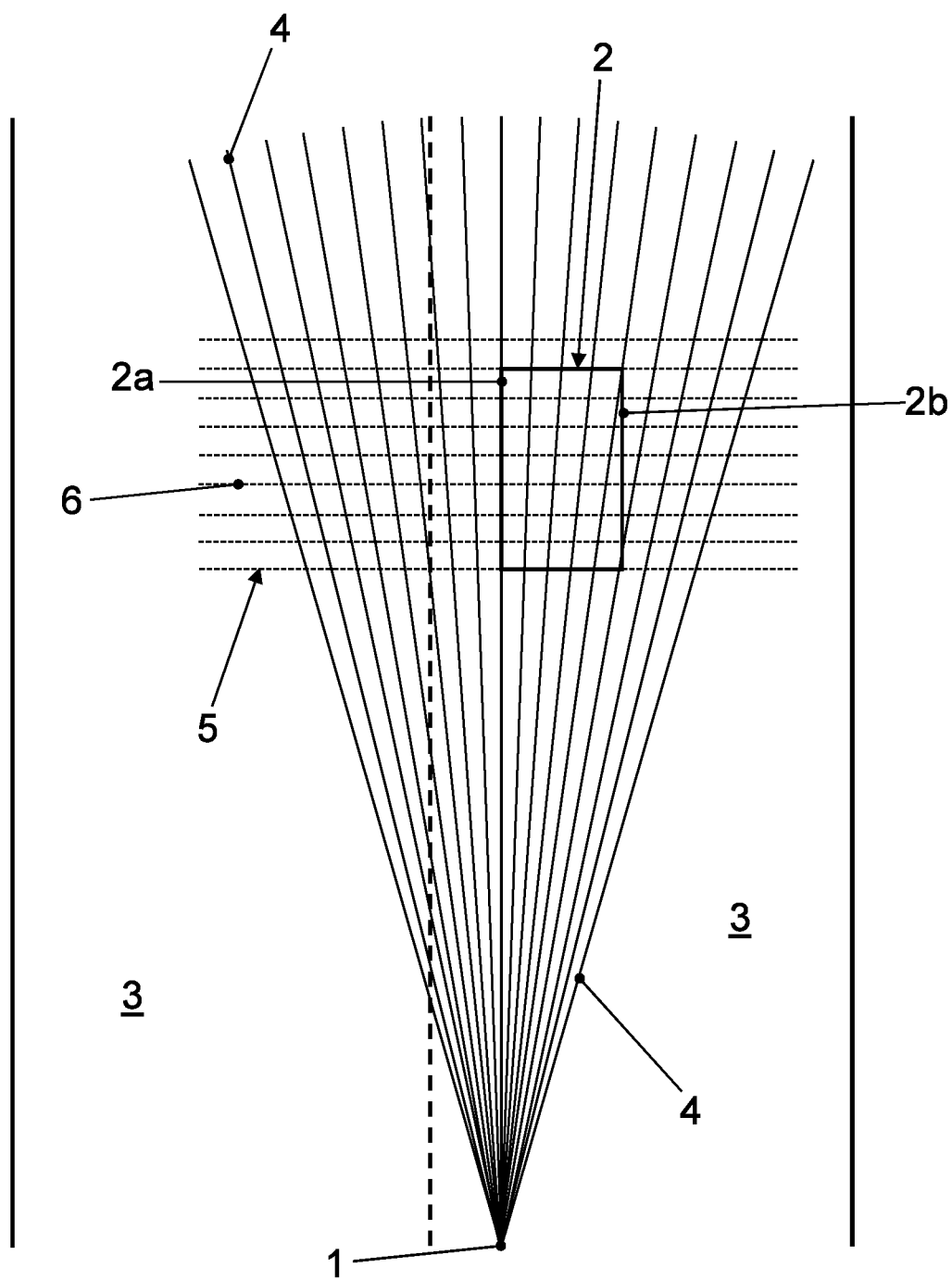
FIG. 1 shows a schematic representation of a simulation of a projection into the outer region of the vehicle, which is carried out within the scope of a method according to the invention.

The light emerging from headlamp 1 is schematically indicated by beams 4, which divergently spread out from headlamp 1. The distance of individual beams 4 from each other in the horizontal direction, or from left to right in FIG. 1, is to correspond to one pixel of a pixel raster 5 projected onto roadway 3 by headlamp 1. Horizontal lines 6 are also drawn in this pixel raster 5, whose distance from each other in the vertical direction, or from top to bottom in FIG. 1, is also to correspond to one pixel of pixel grid 5.

In the input image or in rectangle 2 to be projected, left side 2a and right side 2b, for example, are two regions having the same brightness gradient. A uniform illumination intensity is provided within rectangle 2. This illumination intensity decreases abruptly at sides 2a, 2b.

FIG. 1 shows the calculations or simulation for the projection of rectangle 2 onto roadway 3. It is apparent that left side 2a of rectangle 2 may be optimally imaged because it runs in the same direction as pixel raster 5 of headlamp 1 projected onto roadway 3. This side 2a reaches maximum contrast and the highest possible brightness gradient. The transition of the illumination intensity of the underlying light distribution and the illumination intensity of additionally superimposed rectangle 2 takes place from one pixel to the next.

Right side 2b of rectangle 2, however, runs at an angle to beams 4 or to the direction in which the pixels are arranged one above the other. This side 2b may consequently not be represented directly. Intermediate stages result on this right side 2b. Depending on the size of the surface with which a pixel coincides in rectangle 2 to be represented, this pixel receives a corresponding intermediate value. As a result, a lower brightness gradient results on this side 2b of rectangle 2 than on left side 2a. The transition from the illumination intensity of the underlying light distribution and the illumination intensity of additionally superimposed rectangle 1 takes place across multiple pixels.

For the driver, this appears as though left side 2a were shown to be sharper than right side 2b, which may result in irritation for the driver and lower acceptance.

Figure 2:
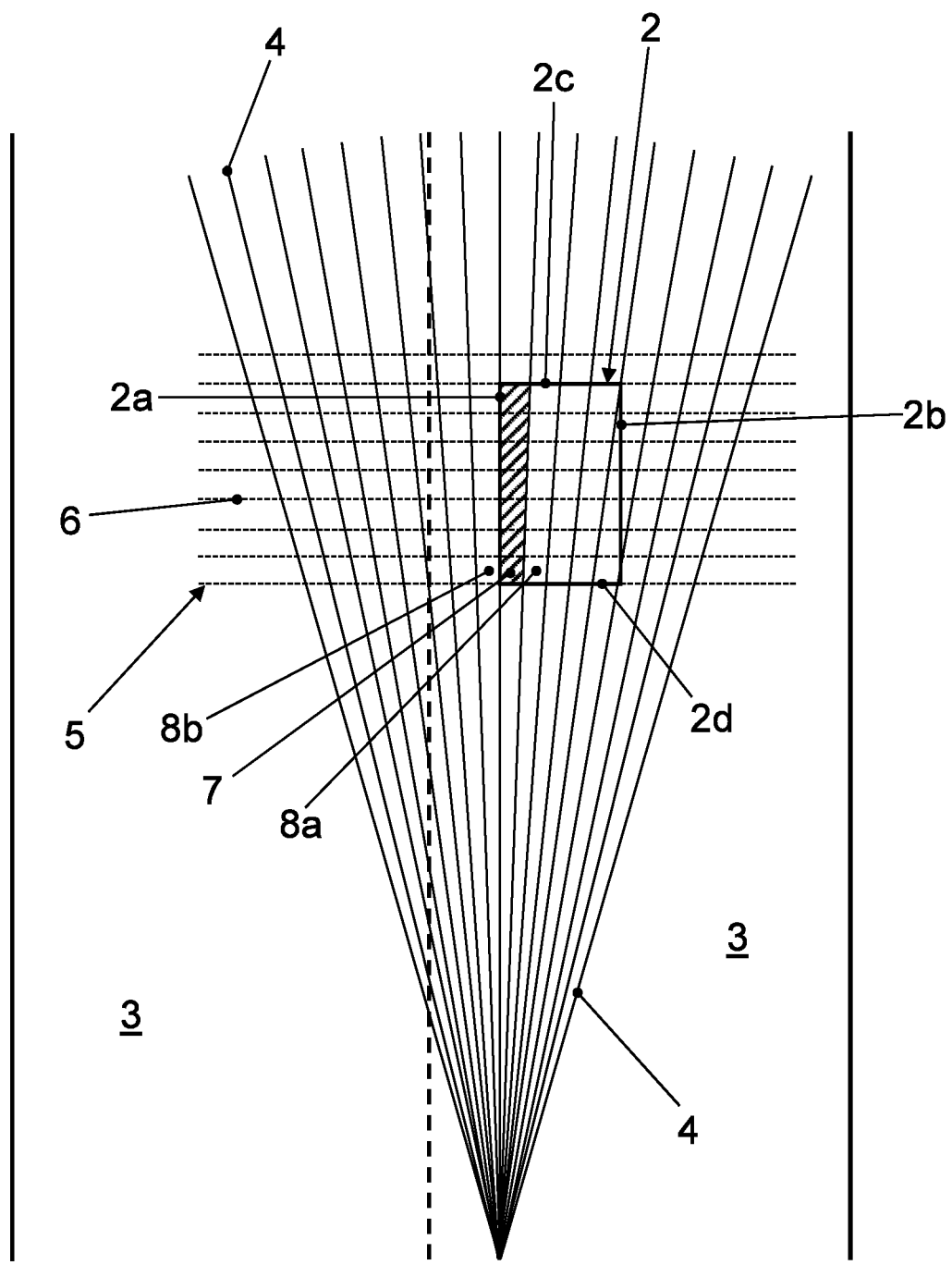
FIG. 2 shows a representation corresponding to FIG. 1 of a simulation of the projection after the matching of the brightness gradients.

To avoid this, the brightness gradient of left side 2a is adapted to the brightness gradient of right side 2b or reduced with the aid of a method according to the invention, as illustrated in FIG. 2. This takes place, in particular, in that headlamp 1 is controlled in such a way that pixels 7 abutting side 2a on the right receive an illumination intensity which is lower than the uniform illumination intensity of rectangle 2. For example, the illumination intensity of pixels 7 corresponds to the mean value between the illumination intensity of an adjacent pixel 8a in rectangle 2 and an adjacent pixel 8b outside rectangle 2.

The driver receives a symbol projection as the result, which has the same transitional gradient on left and right sides 2a, 2b.

It is entirely possible to alternatively or additionally apply the method in the same way to upper and lower sides 2c, 2d of rectangle 2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a high-resolution headlamp of a vehicle, the headlamp being configured to project an image into an outer region of the vehicle, the method comprising:
    selecting at least two regions in the image to be projected which are desired to have a same brightness gradient as one another;
    analyzing brightness gradients of the at least two regions; and
    when a difference in the brightness gradients of the at least two regions is detected during the analysis, controlling the headlamp such that the brightness gradients of the at least two regions are matched to each other.

2. The method according to claim 1, wherein, when the difference in the brightness gradients of the at least two regions is detected, at least one of the brightness gradients of the at least two regions is reduced to a value of a lowest brightness gradient of the at least two regions.

3. The method according to claim 2, wherein, when the difference in the brightness gradients of the at least two regions is detected, multiple or all brightness gradients of the at least two regions are reduced to the value of the lowest brightness gradient of the at least two regions.

4. The method according to claim 1, wherein the method is repeated, in that at least two other regions in the image to be projected, that are desired to have a same brightness gradient as one another, are selected.

5. The method according to claim 1, wherein the at least two regions are edges of the image to be projected.

6. The method according to claim 1, wherein the at least two regions are spaced a distance apart in the horizontal direction.

7. The method according to claim 1, wherein the at least two regions are spaced a distance apart in the vertical direction.

8. The method according to claim 1, wherein the analysis of the brightness gradients of the at least two regions takes place in that the projection is simulated in a control device of the headlamp.

9. The method according to claim 1, wherein the image to be projected comprises a piece of information in the form of at least one symbol, and/or at least one letter, and/or at least one number.

10. A high-resolution headlamp for a vehicle, the headlamp comprising:
    a plurality of illuminating elements for a targeted generation of pixels of a light distribution, the headlamp being configured to project an image into an outer region of the vehicle,
    wherein the headlamp is configured to carry out the method according to claim 1.

11. The high-resolution headlamp according to claim 10, wherein the headlamp comprises a control device, which is configured to control the illuminating elements for the targeted generation of the pixels of the light distribution.

12. The high-resolution headlamp according to claim 11, wherein the control device is configured to carry out the analysis of the brightness gradients of the at least two regions.

13. The high-resolution headlamp according to claim 10, wherein the illuminating elements are light-emitting diodes or laser diodes, or wherein the illuminating elements are part of a solid-state LED array.

14. The high-resolution headlamp according to claim 10, wherein the illuminating elements are part of a digital micromirror device, an LCoS or an LC display.

* * * * *